United States Patent
Chasman et al.

(10) Patent No.: US 8,656,291 B2
(45) Date of Patent: Feb. 18, 2014

(54) SYSTEM, METHOD AND COMPUTER PROGRAM PRODUCT FOR DISPLAYING DATA UTILIZING A SELECTED SOURCE AND VISUALIZATION

(75) Inventors: Douglas Eliot Chasman, Pittsford, NY (US); Neelav Rana, San Francisco, CA (US); Patrick Yu Pang Louie, San Francisco, CA (US); Thomas Dominic Sola, San Francisco, CA (US); Leo Tenenblat, Albany, CA (US)

(73) Assignee: salesforce.com, inc., San Francisco, CA (US)

( * ) Notice: Subject to any disclaimer, the term of this patent is extended or adjusted under 35 U.S.C. 154(b) by 443 days.

(21) Appl. No.: 13/021,671

(22) Filed: Feb. 4, 2011

(65) Prior Publication Data

US 2011/0225525 A1 Sep. 15, 2011

Related U.S. Application Data

(60) Provisional application No. 61/313,616, filed on Mar. 12, 2010.

(51) Int. Cl.
*G06F 3/048* (2013.01)
(52) U.S. Cl.
USPC .......................................................... 715/763
(58) Field of Classification Search
USPC .......................................................... 715/763
See application file for complete search history.

(56) References Cited

U.S. PATENT DOCUMENTS

| | | | |
|---|---|---|---|
| 7,209,929 B2 | 4/2007 | Dominguez, Jr. et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | |
| 2004/0001106 A1* | 1/2004 | Deutscher et al. | 345/838 |
| 2005/0065925 A1 | 3/2005 | Weissman et al. | |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2007/0130113 A1* | 6/2007 | Ting | 707/2 |
| 2009/0158218 A1* | 6/2009 | Brooks et al. | 715/854 |
| 2009/0164915 A1* | 6/2009 | Gasn et al. | 715/753 |
| 2010/0005008 A1* | 1/2010 | Duncker et al. | 705/27 |
| 2010/0010885 A1* | 1/2010 | Hill et al. | 705/14.15 |
| 2010/0262928 A1* | 10/2010 | Abbott | 715/769 |

OTHER PUBLICATIONS

U.S. Appl. No. 60/828,192, filed Oct. 4, 2006.

* cited by examiner

*Primary Examiner* — Sara England
*Assistant Examiner* — Angie Badawi
(74) *Attorney, Agent, or Firm* — Zilka-Kotab, PC

(57) ABSTRACT

In accordance with embodiments, there are provided mechanisms and methods for displaying data utilizing a selected source and visualization. These mechanisms and methods for displaying data utilizing a selected source and visualization can enable enhanced data display, improved data display development, increased time savings, etc.

18 Claims, 24 Drawing Sheets

138 Of 138 Sources shown

Source Counter

FIG. 20

SYSTEM, METHOD AND COMPUTER PROGRAM PRODUCT FOR DISPLAYING DATA UTILIZING A SELECTED SOURCE AND VISUALIZATION

CLAIM OF PRIORITY

This application claims the benefit of U.S. Provisional Patent Application 61/313,616, entitled "METHOD AND SYSTEM FOR DESIGNING AND BUILDING A DASHBOARD IN AN MTS," by Chasman et al., filed Mar. 12, 2010 SFC1P077+/195PROV), the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to displaying data, and more particularly to configuring the display of data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems commonly allow for the display of data from the system. For example, data from the system may be visually analyzed and displayed utilizing a table, graph, or other means of display. Unfortunately, techniques for creating a visual analysis and display of data have been associated with various limitations.

Just by way of example, traditional methods of developing a visual analysis and display of data may require that an administrator or other authorized entity develop such analysis and display on a platform dissociated from the final visual result. These methods may result in slow, time-consuming, and non-intuitive analysis and display development. Accordingly, it is desirable to provide techniques that improve the development of a visual analysis and display of data.

BRIEF SUMMARY

In accordance with embodiments, there are provided mechanisms and methods for displaying data utilizing a selected source and visualization. These mechanisms and methods for displaying data utilizing a selected source and visualization can enable enhanced data display, improved data display development, increased time savings, etc.

In an embodiment and by way of example, a method for displaying data utilizing a selected source and visualization is provided. In one embodiment, one or more sources of data are displayed. Additionally, one or more possible visualizations for the data are displayed. Further, a selection of one of the sources of data and one of the visualizations for the data are received. Further still, the data from the selected source of the data is displayed, utilizing the selected visualization for the data.

While one or more implementations and techniques are described with reference to an embodiment in which displaying data utilizing a selected source and visualization is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 20 illustrates an exemplary source counter, in accordance with another embodiment;

DETAILED DESCRIPTION

General Overview

Systems and methods are pr vided for displaying data utilizing a selected source and visualization.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for displaying data utilizing a selected source and visualization will be described with reference to example embodiments.

Figure 1:
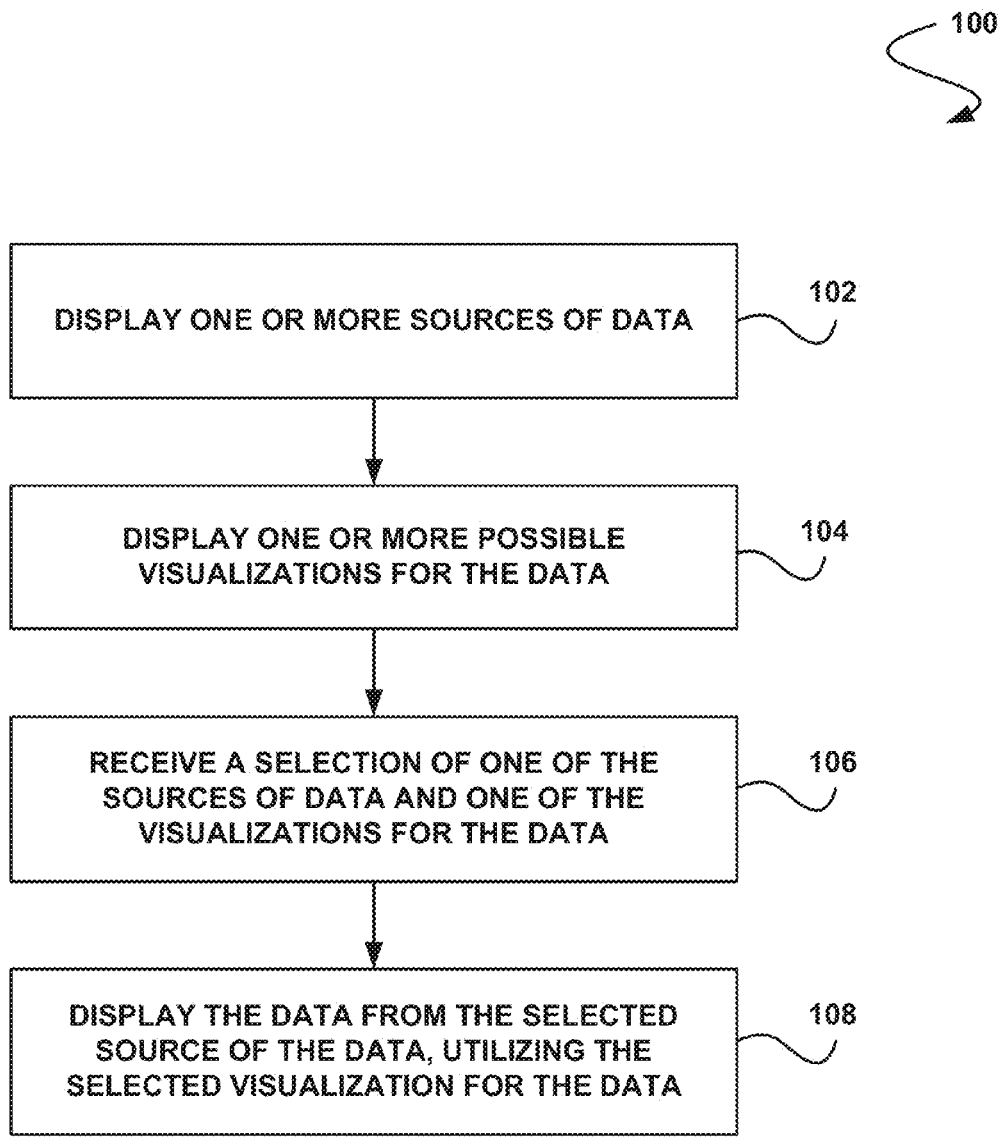
FIG. 1 illustrates a method for displaying data utilizing a selected source and visualization, in accordance with one embodiment.

FIG. 1 illustrates a method 100 for displaying data utilizing a selected source and visualization, in accordance with one embodiment. As shown in operation 102, one or more sources of data are displayed. In one embodiment, the data may include one or more reports. For example, the data may include one or more summaries of data, one or more analyses of data, one or more collections of data, etc. In another embodiment, the data may be associated with one or more users of a system, one or more organizations of the system, etc. For example, the data may include a summary report for a sales department of a system for a predetermined time period. In yet another embodiment, the system may include a client, a server, a multi-tenant on-demand database system, etc.

Additionally, in one embodiment, the sources of data may include one or more locations of the data within the system. For example, the sources of data may include a file folder containing the data. In another example, the source of the data may include a record file including the data, a report file including the data, etc. In yet another embodiment, one or more icons may be associated with the sources of data. In still another embodiment, one or more names may be associated and displayed with the sources of data. For example, a file name associated with a file including the data may be displayed next to an icon representing the file. Further, in one embodiment, the sources of data may be displayed utilizing a file system architecture.

Also, in another embodiment, the sources of data may be displayed as the result of a search. For example, a user may perform search for reports they have created, recent reports, reports owned by the user, etc. In this way, the sources of data may be able to be quickly found and accessed.

Further still, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Also, as shown in operation 104, one or more possible visualizations for the data are displayed. In one embodiment, the possible visualizations of the data may include one or more methods of visually representing the data. For example, the possible visualizations of the data may include one or more charts for displaying the data, tables for displaying the data, bar graphs for displaying the data, line graphs for displaying the data, gauges for displaying the data, etc.

Additionally, in one embodiment, the one or more sources of data as well as the one or more possible visualizations for the data may be displayed in association with an editor (e.g., a dashboard editor, a report editor, a presentation editor, etc.) workspace. For example, a dashboard may include a combination of one or more system data visualizations or other statistical system information visualizations for presentation to a user of the system. Further, the dashboard editor may enable at least the addition, removal, editing, etc. of the content of the dashboard. In another example, the one or more sources of the data and the one or more possible visualizations for the data may be displayed in a window of the dashboard editor, in a window adjacent to the dashboard editor, etc. In another embodiment, the one or more sources of data and the one or more possible visualizations for the data may be displayed in separate windows.

Further still, as shown in operation 106, a selection of one of the sources of data and one of the visualizations for the data are received. In one embodiment, the selection of one of the sources of data and one of the visualizations for the data may be performed by a user (e.g., a user of the editor within the system, etc.). In another embodiment, the selection may be performed by clicking and dragging one of the sources of data and one of the visualizations for the data onto a location within the editor. In yet another embodiment, the editor may include an editor for a dashboard of a multi-tenant on-demand database system.

Also, in one embodiment, one of the sources of data may be selected before the selection of one of the visualizations for the data. For example, an icon associated with one of the sources of data may be dragged onto the editor, and one of the visualizations for the data may then be dragged onto the icon associated with one of the sources of data within the editor. In another embodiment, one of the visualizations for the data may be selected before the selection of one of the sources of data. For example, an icon associated with one of the visualizations for the data may be dragged onto the editor, and one of the sources of data may then be dragged onto the icon associated with one of the visualizations for the data within the editor.

In addition, as shown in operation 108, the data from the selected source of the data is displayed, utilizing the selected visualization for the data. In one embodiment, the data may be displayed to the user from whom the selection is received. In another embodiment, the data may be displayed within the editor. Further, in another embodiment, the data may be rendered within the selected visualization for the data. In yet another embodiment, the data may be instantly displayed utilizing the selected visualization for the data. For example, the data may be immediately rendered within the editor utilizing the selected visualization for the data when the selection is received. In this way, an instant preview may be provided to the user.

Further, in one embodiment, one or more properties of the selected visualization may be configured. For example, one or more labels of the visualization may be edited, one or more colors of the visualization may be changed, one or more percentages or other data may be shown within the visualization, etc. In another embodiment, the configuration of the visualization may be immediately updated. In this way, the data may be merged with the visualization of the data and the user may be given immediate feedback while configuring the display of the data by binding the functionality of the visualization with the visualization itself. Additionally, enabling the display of data utilizing a visualization may be simplified, and may therefore be more user friendly and approachable to system users.

Figure 2:
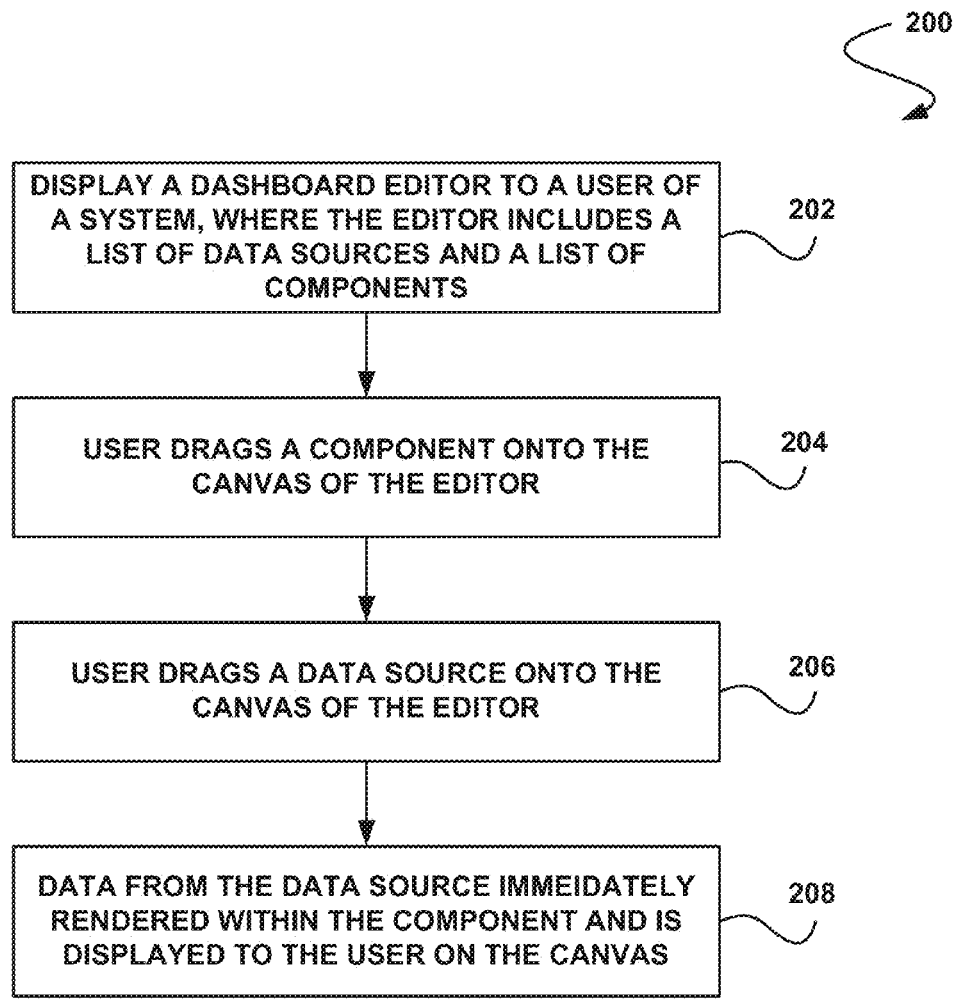
FIG. 2 illustrates a method for building a component in a dashboard editor, in accordance with another embodiment.

FIG. 2 illustrates a method 200 for building a component in a dashboard editor, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, a dashboard editor is displayed to a user of a system, where the editor includes a list of data sources and a list of components. In one embodiment, the dashboard editor may include a graphical interface for building and editing dashboards. In another embodiment, the data sources and the components may each be represented by an icon within a window of the editor. In yet another embodiment, a component may include a visualization that is used to display data located at a data source.

Additionally, in one embodiment, one or more of the components may be customizable by the user. For example, a component template may be used to configure one or more elements of a component. In another embodiment, metadata associated with a component may be saved and re-used to create another similar component. In yet another embodiment, components may be created by one or more developers, sold on an application exchange, etc.

Also, in one embodiment, the editor may include a main canvas that simulates the display of the finished dashboard. In another embodiment, the canvas may have one or more vertical columns, one or more horizontal columns, one or more predetermined layouts, etc. In yet another embodiment, one or more of the columns may be relocated or removed by the user. In this way, one or more components may be added to a predefined location within the canvas. In another embodiment, a component may be situated on top of another component within the canvas.

Further, as shown in operation 204, the user drags a component onto the canvas of the editor. In one embodiment, the user may click on the icon corresponding to the desired component using a cursor and may then drag the selected icon onto the canvas. In another embodiment, once the icon has been dragged onto the canvas, the component associated with the icon may be shown on the canvas.

Further still, as shown in operation 206, the user drags a data source onto the canvas of the editor. In one embodiment, the user may click on the icon corresponding to the desired data source using a cursor and may then drag the selected icon onto the canvas. In another embodiment, the user may drag the data source onto the component that had previously been dragged onto the canvas. For example, a bar chart may be selected from the list of components and may be dragged onto the canvas of the dashboard editor. Additionally, a report may be selected from the list of data sources and may be dragged and dropped onto the bar chart on the canvas.

Also, as shown in operation 208, the data from the data source is immediately rendered within the component and is displayed to the user on the canvas. In one embodiment, the data may first be retrieved from the selected data source (e.g., a database of the system, etc.), and the component may then be populated with the retrieved data. For example, once the report is dragged and dropped onto the bar chart on the canvas, the bar chart may be automatically updated with the report data. In this way, the data source and the component may be instantly merged, thereby enabling the user to intuitively design the dashboard graphically utilizing the canvas with instant feedback as to how the finished dashboard design will look. Additionally, the user may be able to directly manipulate the component and the visualization of the data of data sources in a graphical manner.

In another embodiment, the data source may first be dragged onto the canvas, where the data source may be represented by an abstract representation (e.g., an icon, etc.) on the canvas. Additionally, the component may then be dragged on top of the data source on the canvas. In yet another embodiment, a plurality of components may be dragged onto the canvas and may be arranged within the canvas.

Further, in one embodiment, the data displayed within the component may be filtered. For example, the component may display data having a field common to one or more additional components (e.g., an opportunity field, etc.), and the information that is shown using the component may be filtered by a type of the field (e.g., a type of opportunity, etc.). In another example, the component may be filtered utilizing a picklist whose value is selected by the user.

Figure 3:
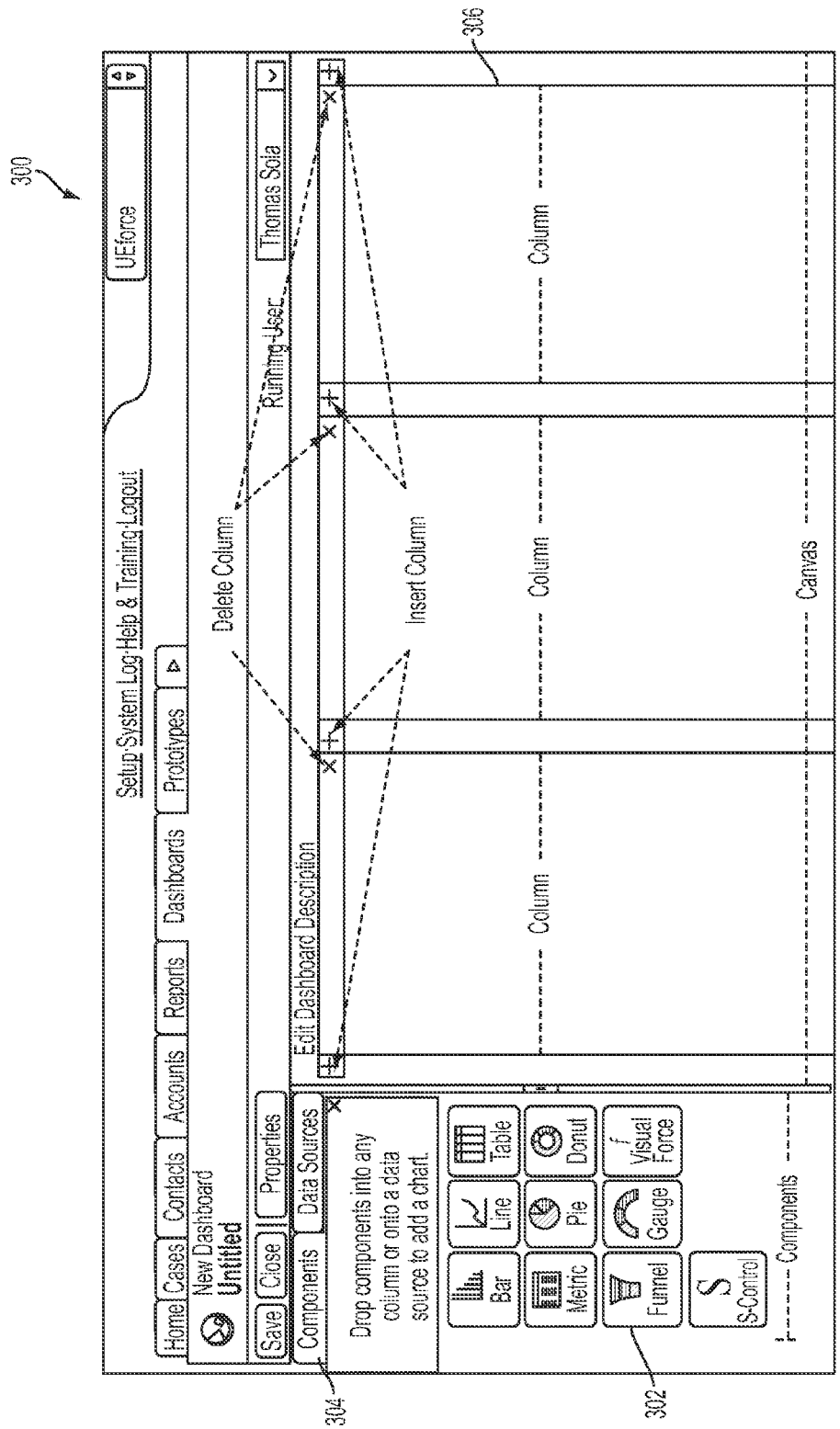
FIG. 3 illustrates an exemplary dashboard, in accordance with another embodiment.
Figure 4:
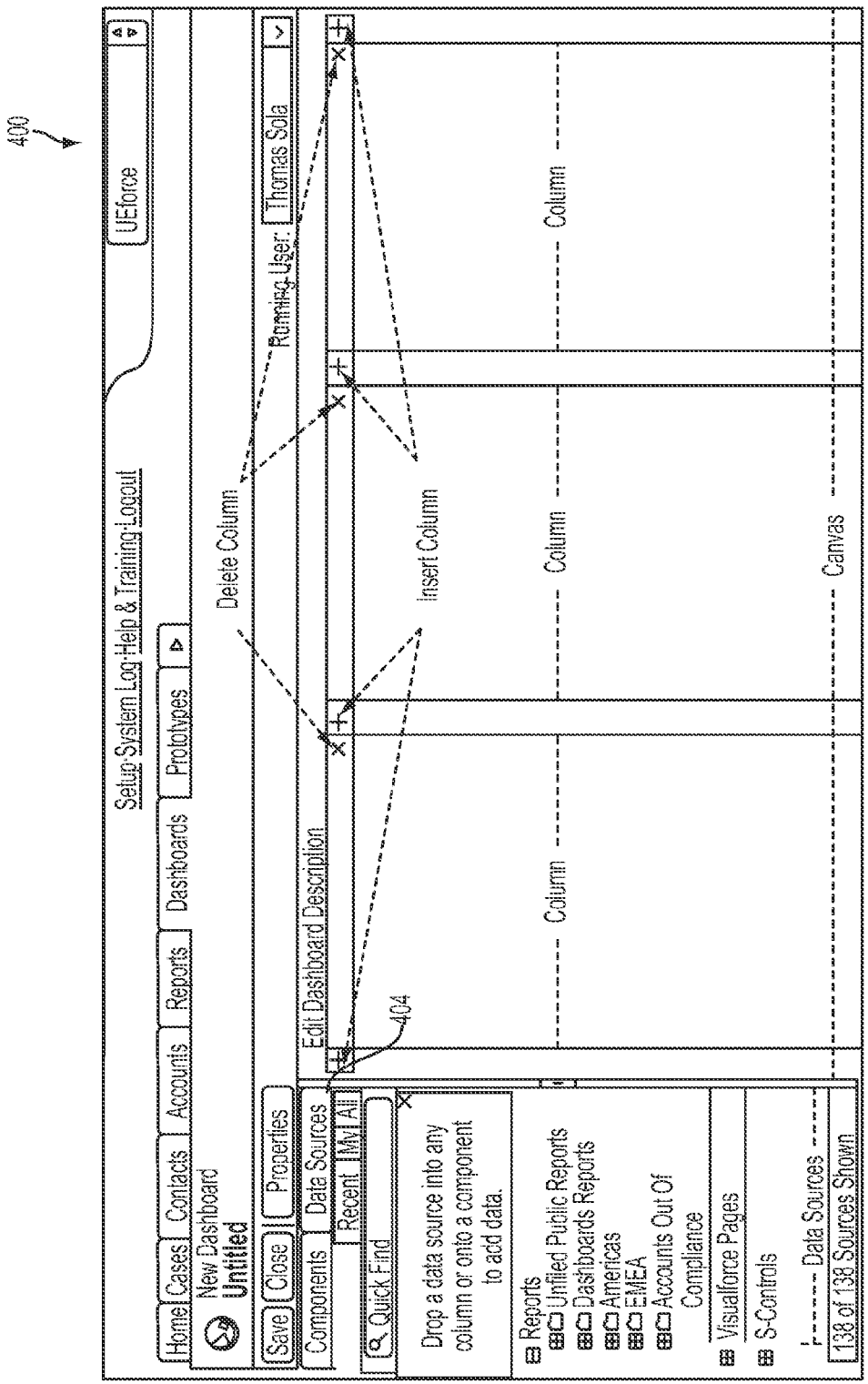
FIG. 4 illustrates another exemplary dashboard, in accordance with another embodiment.

Further still, in one embodiment, the dashboard may be comprised of a sidebar that contains tabs to switch between drag-able components and drag-able data sources and a canvas that houses the dashboard description as well as the columns. FIG. 3 illustrates an exemplary dashboard 300 including a sidebar 302 that displays a plurality of components upon the selection of a components tab 304, in accordance with one embodiment. In one embodiment, one or more components may be dragged from the sidebar 302 onto any of the columns of the canvas 306. Additionally, FIG. 4 illustrates another exemplary dashboard 400 including a sidebar 402 that displays a plurality of data sources upon the selection of a data sources tab 404, in accordance with another embodiment. In another embodiment, one or more data sources may be dragged from the sidebar 402 onto the canvas 406.

Figure 5:
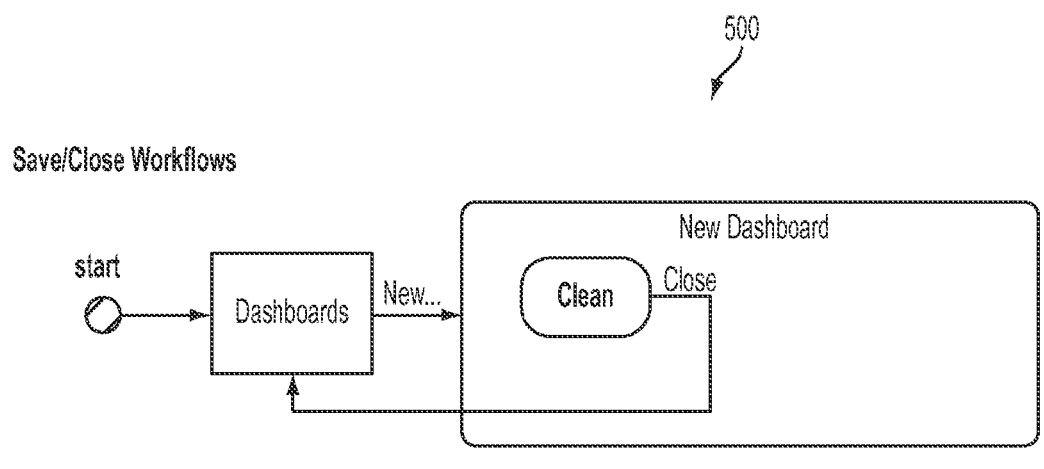
FIG. 5 illustrates a workflow for closing a clean dashboard, in accordance with another embodiment.

Further, FIG. 5 illustrates a workflow 500 for closing a clean dashboard, in accordance with one embodiment. In one embodiment, a dashboard may be clean when no edits have been made, and may be dirty when edits have been made, even if they are reverted. In another embodiment, a user may have the option to close a dashboard and return to the page they came from if they decide to quit the "New" or "Edit"

task. In yet another embodiment, if the dashboard has a clean state and the user clicks "Close," they may be returned directly to the referring page.

Figure 6:
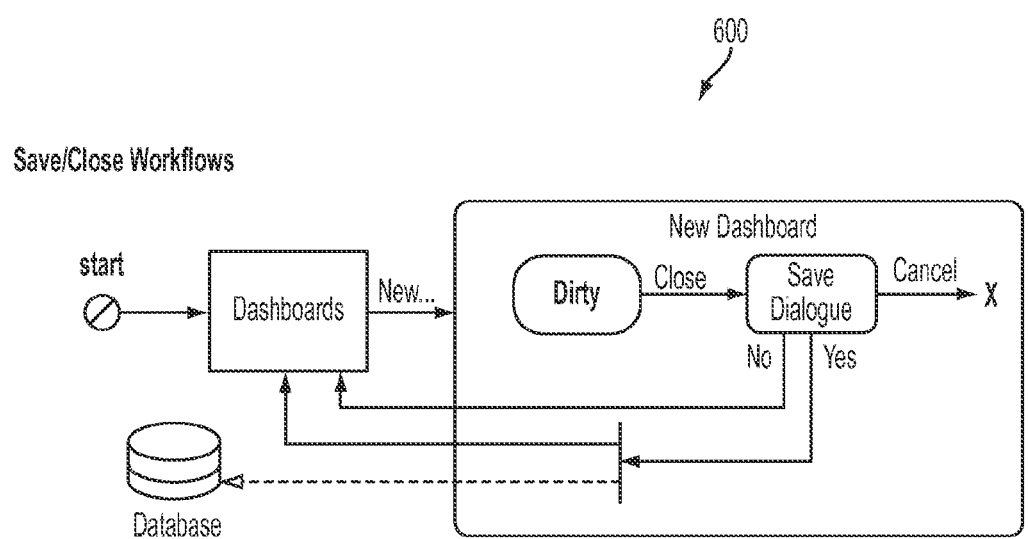
FIG. 6 illustrates a workflow for closing a dirty dashboard, in accordance with another embodiment.

Further still, FIG. 6 illustrates a workflow 600 for closing a dirty dashboard, in accordance with another embodiment. In one embodiment, once an edit has been made, the dashboard receives a dirty state. Since it cannot be predicted whether the edits made are desired or not the user may be prompted to save their changes even if they click "close." In another embodiment, the user may be presented with a "save" dialogue with three buttons: Yes, and Cancel. For example, clicking "Yes" may write the changes to the database and return the user to the referring page. In another example, clicking "no" may disregard all changes made since the last write to the database and may return the user to the referring page. In yet another example, clicking "cancel" may close the dialogue and may leave the user on the new/edit page.

Figure 7:
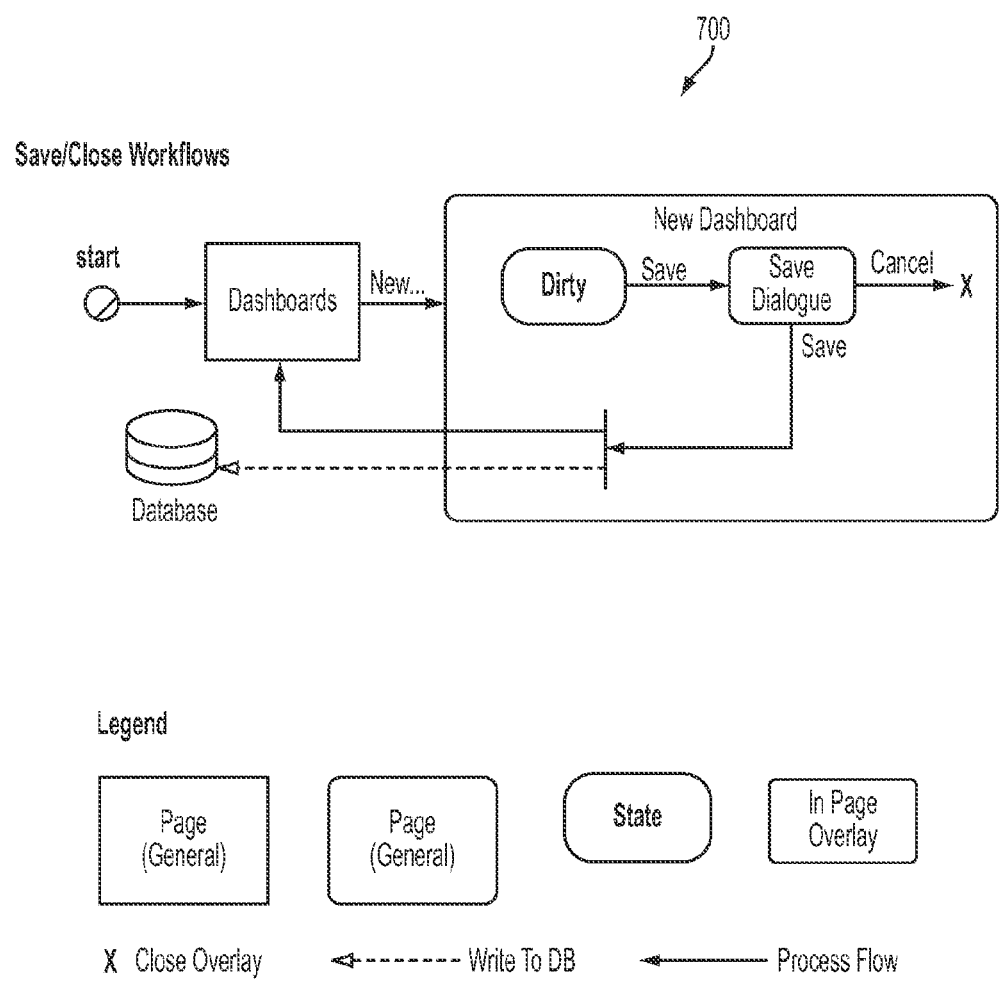
FIG. 7 illustrates a workflow for saving a dirty dashboard, in accordance with another embodiment.

Also, FIG. 7 illustrates a workflow 700 for saving a dirty dashboard, in accordance with one embodiment. In one embodiment, when a new or existing dashboard is opened, the "save" button may have a disabled state until an edit is made. Once an edit is made, the "save", button may receive an active state. In another embodiment, when the user clicks "save" on a dirty dashboard they may be presented with a dialogue prompting for the name and folder of the dashboard. By default these values may be populated with the last saved values. Additionally, clicking "save" may write the information to the database and may return the user to the referring page. Further, clicking "cancel" may close the dialogue, leaving the user on the new/edit page.

Figure 8:
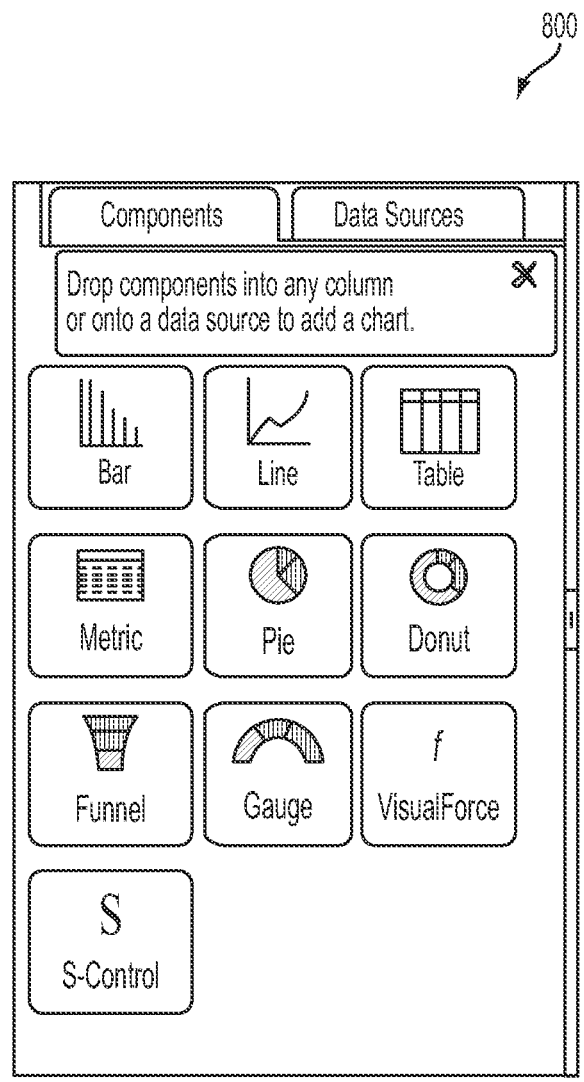
FIG. 8 illustrates an exemplary sidebar, in accordance with another embodiment.
Figure 9:
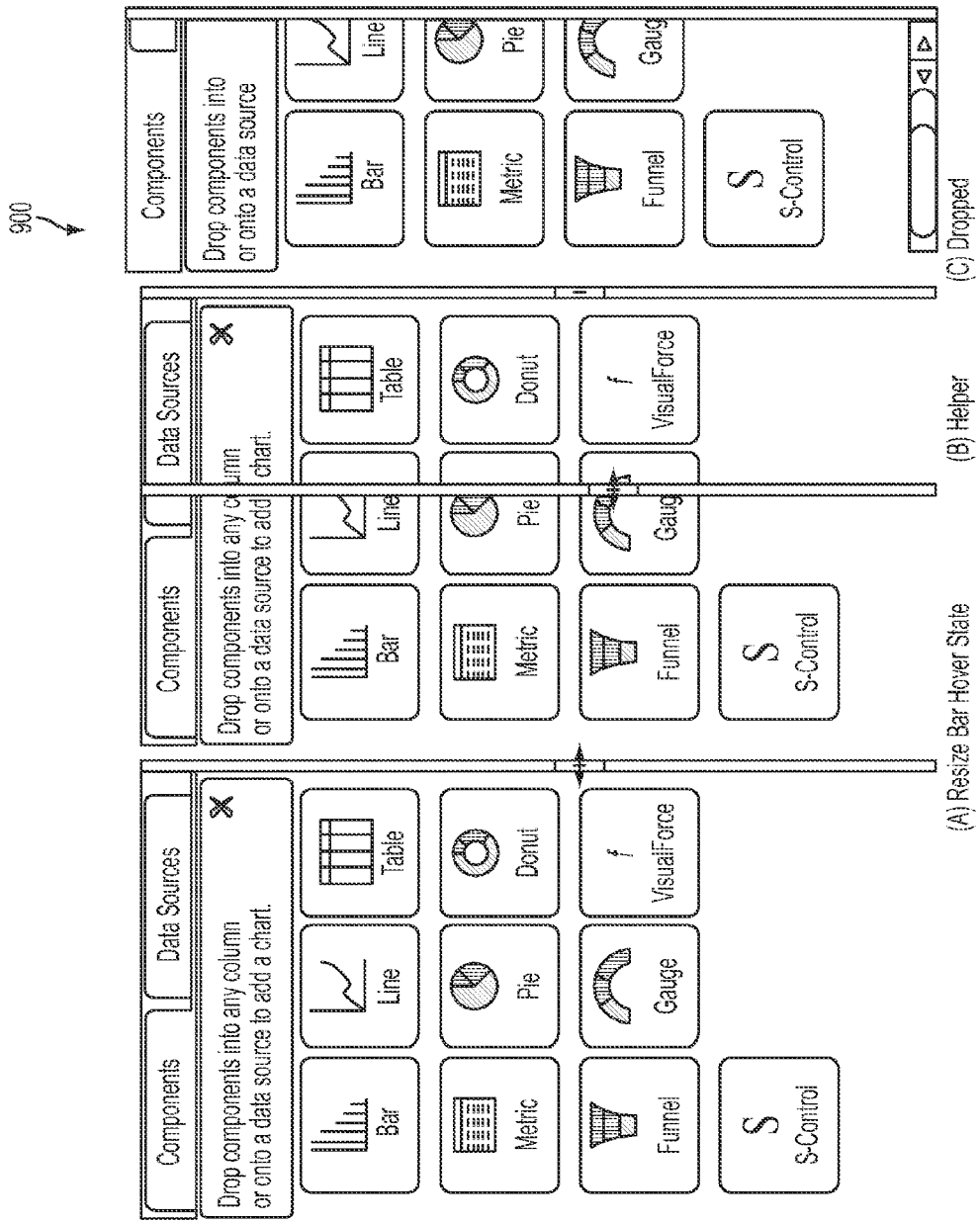
FIG. 9 illustrates an exemplary alteration of the sidebar, in accordance with another embodiment.

In addition, FIG. 8 illustrates an exemplary sidebar 800, in accordance with another embodiment. In one embodiment, the sidebar may include a container that holds the components and data sources for the dashboard and the functionality that goes with those in order to use them such as tabs, filters, trees, etc. Further, FIG. 9 illustrates an exemplary alteration 900 of the sidebar, in accordance with one embodiment. In one embodiment, the sidebar may be resizable and collapsible. In another embodiment, by dragging the sidebar's resize bar, anywhere along its length, the sidebar may be resized. Also, hovering over the resize bar may change the cursor to the ew-resize state. Further, when dragging the resize bar there may be a "helper" displaying the new position of the resize bar.

Figure 10:
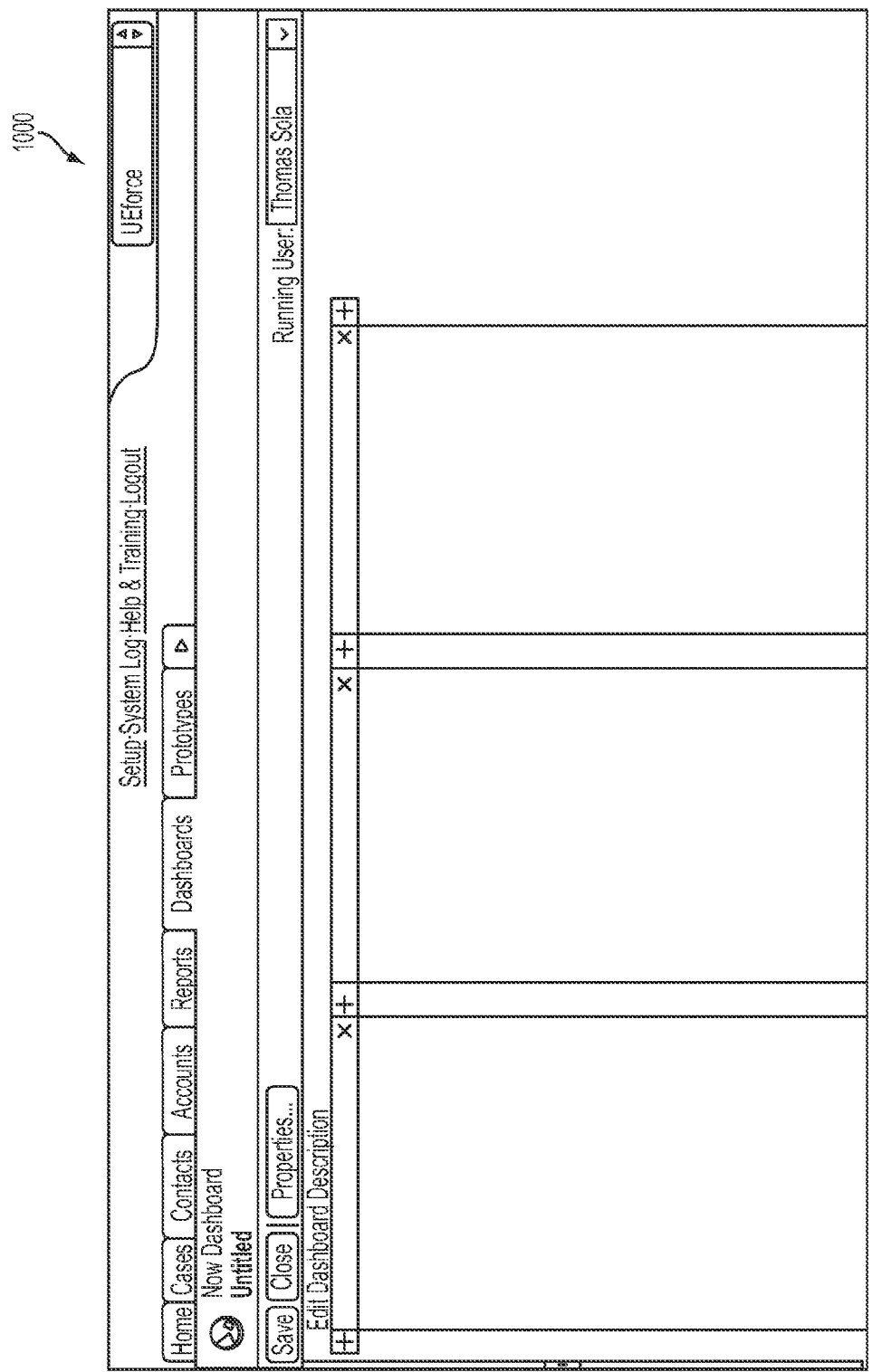
FIG. 10 illustrates a dashboard editor with a minimized sidebar, in accordance with another embodiment.

FIG. 10 illustrates a dashboard editor 1000 with a minimized sidebar, in accordance with one embodiment. In another embodiment, the sidebar may be shrunk to a minimum of 0 and a maximum of 215 pixels. Also, double clicking anywhere along the length of the resize bar may minimize the sidebar if the sidebar has a width greater than 0. In addition, if the sidebar has a width of 0, double clicking anywhere along the length of the resize bar may maximize it to 215 pixels. Further, the sidebar may never be completely removed.

Figure 11:
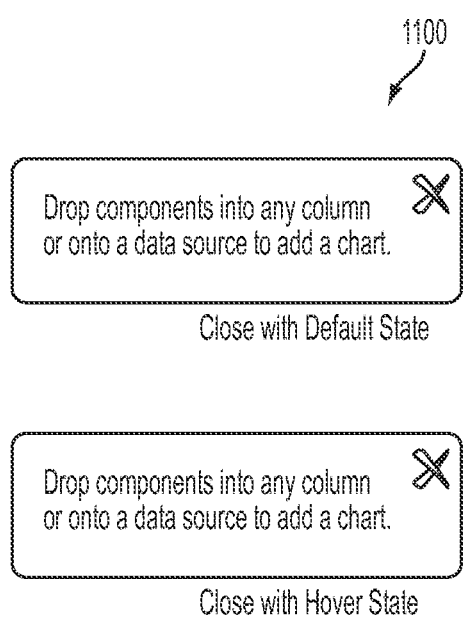
FIG. 11 illustrates exemplary instructions that may accompany the sidebar, in accordance with another embodiment.

FIG. 11 illustrates exemplary instructions 1100 that may accompany the sidebar, in accordance with another embodiment. In yet another embodiment, the instructional text may be located at the top of both the components and data sources sidebar sections. This text may be dismissed by using the "remove" icon in the upper right corner. The "remove" icon may have a default state and a hover state. In another embodiment, once removed, the instructions may not reappear for a given user.

Figure 12:
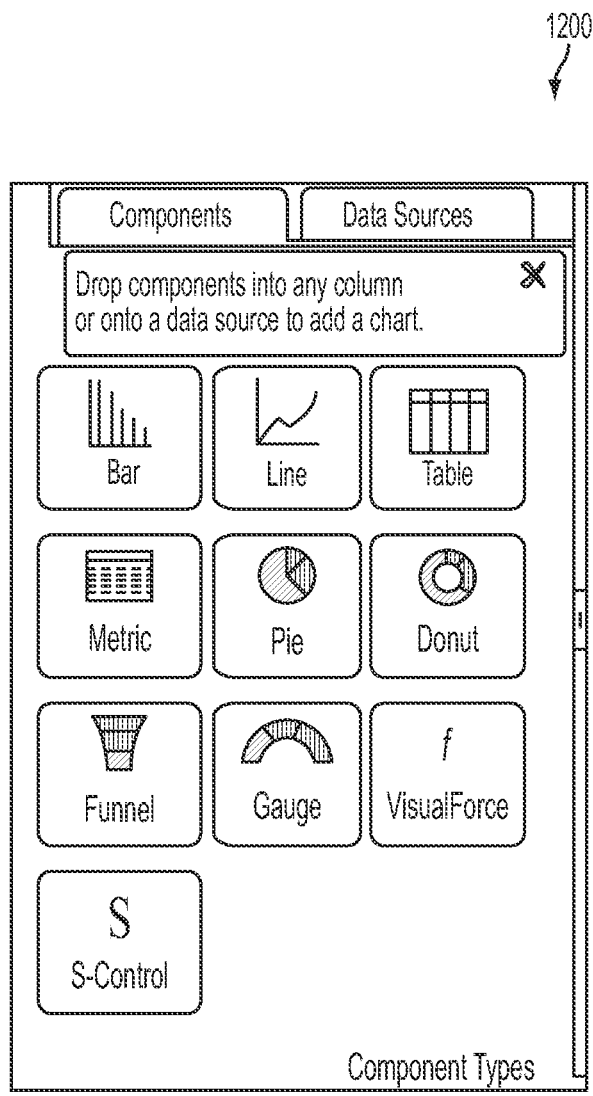
FIG. 12 illustrates exemplary component types within a sidebar, in accordance with another embodiment.
Figure 13:
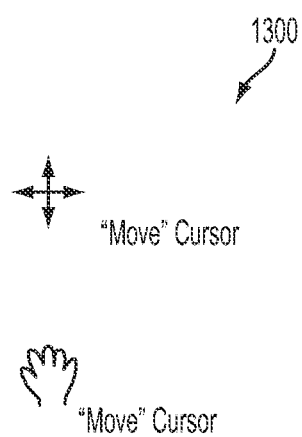
FIG. 13 illustrates exemplary cursors, in accordance with another embodiment.

FIG. 12 illustrates exemplary component types 1200 within a sidebar, in accordance with one embodiment. In another embodiment, component types and data sources may be combined on the dashboard inside the columns to create components. Additionally, the component types may be visually represented by visual "buttons," (e.g., not literal HTML buttons). Programmatically they may be represented semantically as <A> tags inside an unordered list <UL>. In another embodiment, the buttons may have a default state, a hover state, and a dragging state. Since the visual indicator that follows the cursor as an element may be dragged as a rectangle with a "Yes" or "No" image depending on the acceptability of the drop zone, a visual indication may be provided as to which component is being dragged. For this the component may be given a drag state, which may remains visible until the component is dropped regardless if the drop zone is valid or not, whereby it may revert to its default state. The component types may be dragged to the canvas so the cursor may need to indicate this when over a component type by using the "move" cursor image, FIG. 13 illustrates exemplary cursors 1300. Since any number of a given component types may be used in a single dashboard the components may persist in the list. Dragging may not remove the component, not even temporarily.

Figure 14:
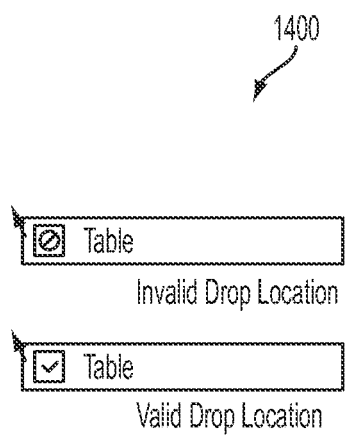
FIG. 14 illustrates exemplary dragging indicators, in accordance with another embodiment.
Figure 15:
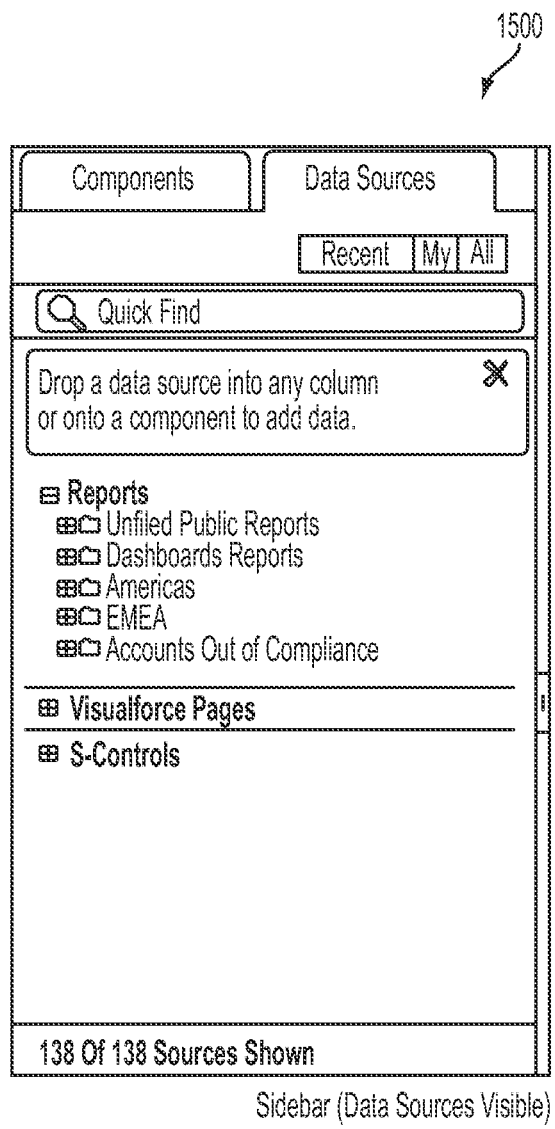
FIG. 15 illustrates exemplary data sources within a sidebar, in accordance with another embodiment.

FIG. 14 illustrates exemplary dragging indicators 1400, in accordance with another embodiment. In yet another embodiment, the drag indicator may follow the cursor that indicates if the area the mouse is over is an acceptable area to drop the object being dragged. In another embodiment, the drag indicator may contain the name of the component type. In the case of dragging a data source, the tide of the data source may be added to the indicator. Further, FIG. 15 illustrates exemplary data sources 1500 within a sidebar, in accordance with one embodiment.

Also, in one embodiment, one or more filters may be used in association with the sidebar. For example, the filters may work by limiting the number of sources shown in the sidebar. In another embodiment, the "recent" filter may be enabled by default. Available filters may include "Recent" (may show recently viewed sources), "My" (may show all sources owned by the user), "All" (may show all sources visible to the user), etc. Filters may be accessed by a row of visual "buttons", (not literal HTML buttons). Programmatically they may be represented semantically as <A> tags inside an unordered list <UL>. With respect to states, the buttons may have a selected state, a selected hover state, an unselected state, an unselected hover state, and a disabled state. In another embodiment, clicking on a non-disabled filter may immediately and dynamically update the list of resources.

Figure 16:
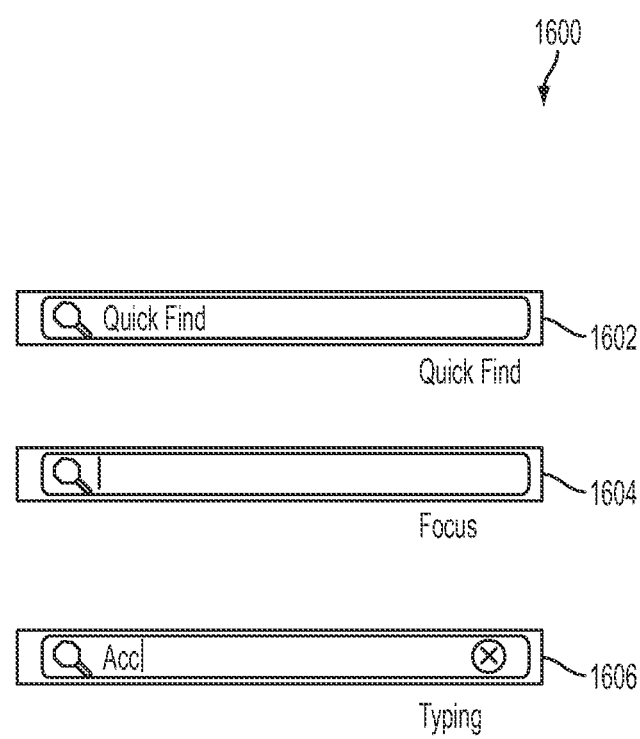
FIG. 16 illustrates an exemplary quick find workflow, in accordance with another embodiment.

FIG. 16 illustrates an exemplary quick find workflow 1600, in accordance with one embodiment. In another embodiment, the quick find functionality may be a fast way of filtering through many sources by typing. The search may be affected on KeyUp. The minimum number of characters that need to be typed in order to begin filtering may be dependent on response times. When receiving focus the default "quick find" text may be automatically removed, as shown in item 1604. If the user should cause the on Blur event without having typed anything the text "quick find" may return, as shown in item 1602. Once the user begins typing the "clear" icon may appear, as shown in item 1060. Clicking "clear" may erase anything the user has typed and may add the text "quick find" back to the search field, removing focus. This action may also remove the "clear" icon from view. In another embodiment, search criteria may be case insensitive, may match a node or folder name, may match substrings, etc.

Figure 17:
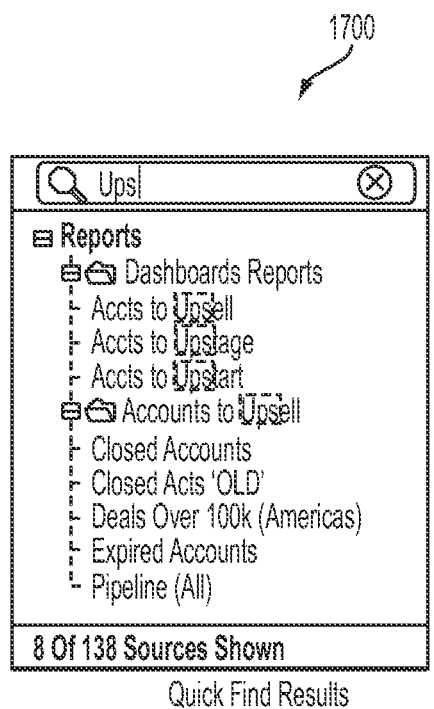
FIG. 17 illustrates exemplary quick find results, in accordance with another embodiment.

FIG. 17 illustrates exemplary quick find results 1700, in accordance with another embodiment. In yet another embodiment, results may be updated on an on KeyUp event, and may highlight the matched string as the user types. This may allow for easy recognition of matched text. In another embodiment, clearing the quick find functionality or erasing back to the beginning may return the maximum, unfiltered results set. Additionally, the quick find functionality may act within the subset of the selected filter.

Figure 18:
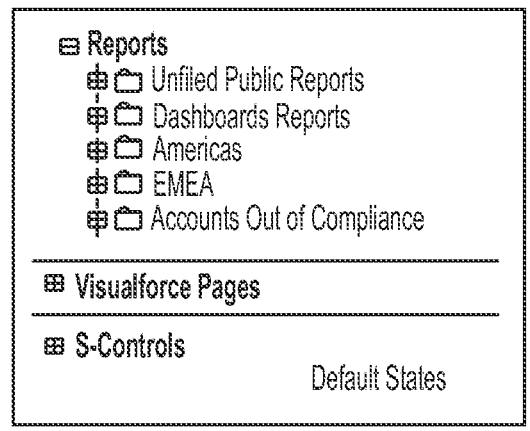
FIG. 18 illustrates a default tree state for a data source sidebar window, in accordance with another embodiment.
Figure 19:
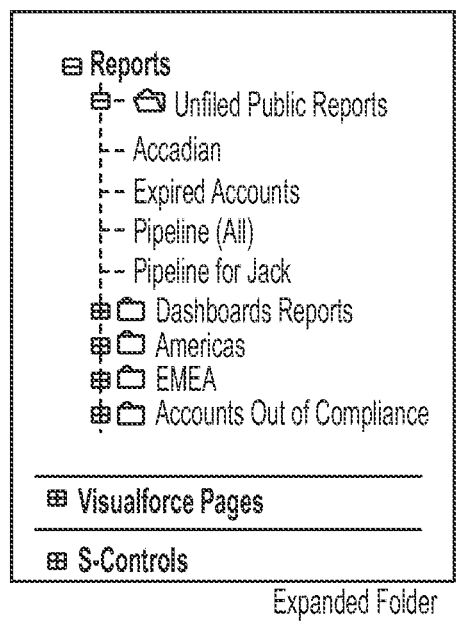
FIG. 19 illustrates an expanded folder within a data source sidebar window, in accordance with another embodiment.
Figure 20:
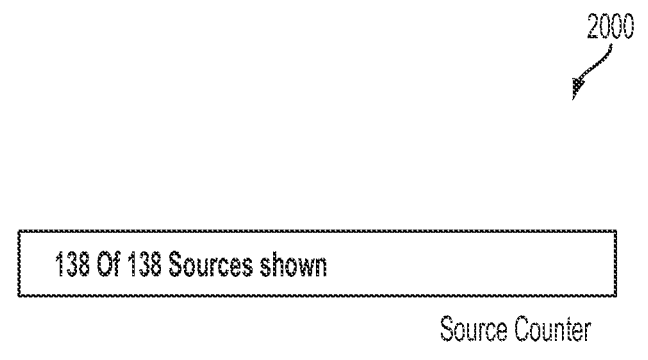

FIG. 18 illustrates a default tree state 1800 for a data source sidebar window, in accordance with one embodiment. In another embodiment, one tree may be provided for each source type. Reports may need the data sources tab loads with the reports' top-most level expanded revealing the folders therein. System pages and S-Controls may be collapsed. FIG. 19 illustrates an expanded folder 1900 within a data source sidebar window, in accordance with another embodiment. In yet another embodiment, clicking any folder may expands that folder in addition to any other content that had been previously expanded. In another embodiment, folders may lazy load so the user may not wait for each and every source to load before they can begin using the tree. This may be checked against average load times. Additionally, FIG. 20 illustrates an exemplary source counter 2000 that may sit at the bottom of the sidebar and may display the number of sources shown out of the total number of sources available to the user.

Figure 21:
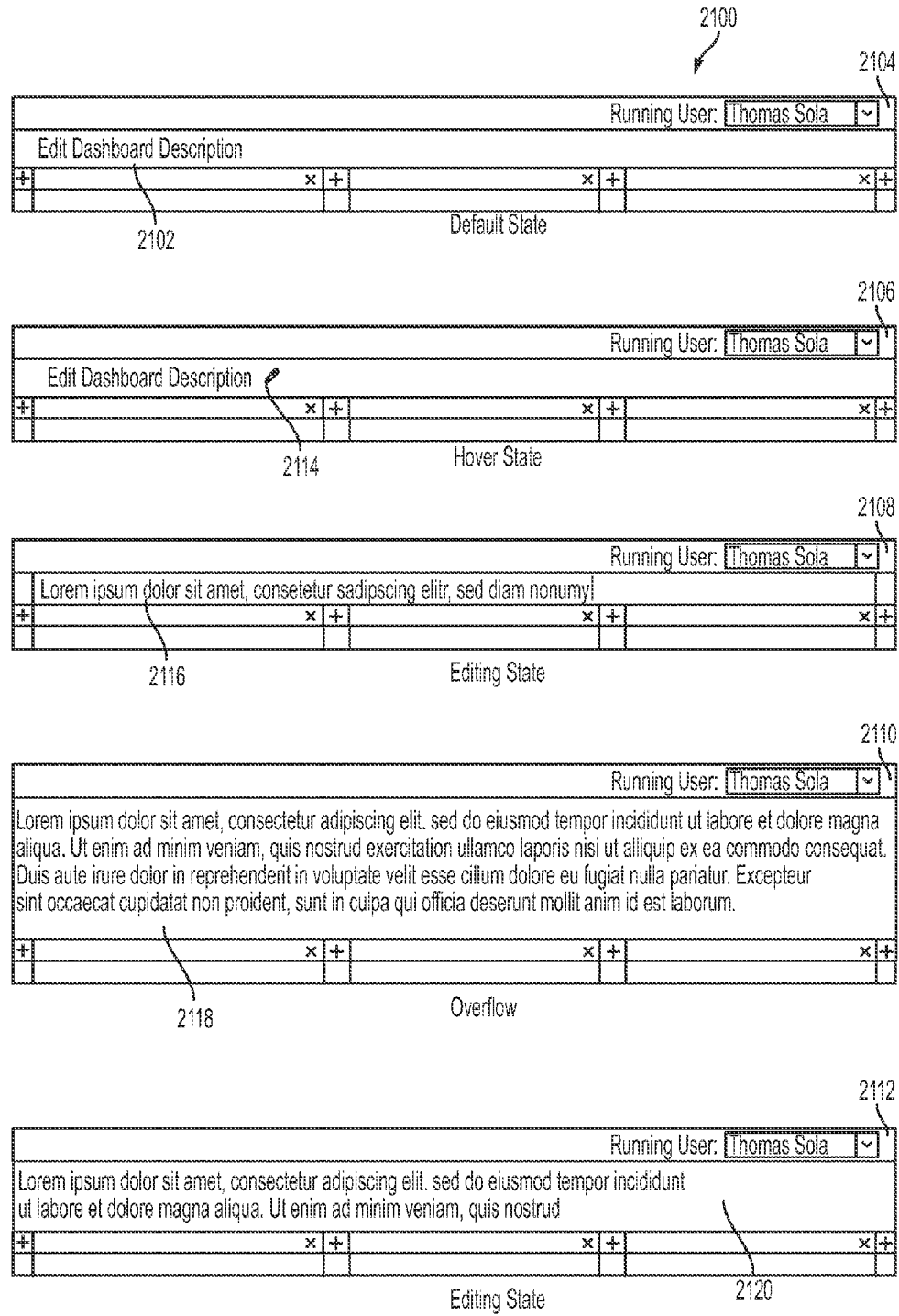
FIG. 21 illustrates various dashboard element states, in accordance with another embodiment.

FIG. 21 illustrates various dashboard element states 2100, in accordance with one embodiment. For example, at the top of a dashboard, in view or edit mode, is the description 2102. The description may allow the user to input up to a predetermined amount of characters. The description text area may have a default state 2104, a hover state 2106, an edit state 2108, an overflow state 2110, and an edited state 2112. With the hover event, the standard pencil/Edit icon 2114 may appear indicating to the user that this is an area they can edit. With focus the text area may gain a border 2116 and the text may change color. If the text the user enters goes past the right edge the text area 2118 should expand in height with each new row. When the blur event is triggered the text area 2120 may collapse its height to leave only the first row showing and may add an ellipsis to indicate there is truncated text. Also the border 2116 added on Focus may be removed.

Additionally, with respect to columns, dashboards may allow a varying number of columns, which may be added and removed dynamically. In one embodiment, a new dashboard may opens with a predetermined amount of columns (e.g., 3 columns, etc.). There may be "insert" buttons available between each column and to the outside of either outside-most column. Columns may be inserted in any of these locations. Further, the "insert" buttons may have a default state, a hover state, and a disabled state. More specifically, hovering over a button may also show the insert location of the new column to reinforce the action since there is no text to be read explaining the insert. Additionally, any column may be removed. Removing columns may be done via the "remove" icon in the column's upper right. Further, the "remove" icon may have a default state and a hover state. In another embodiment, a column with at least one chart, source, or component may prompt the user to confirm the delete. By default columns may be added at a predetermined width. Further still, by default columns may be added at a predetermined width but there may be a menu available in the column header next to the "remove" icon. This menu may have a default state and a hover state.

Figure 22:
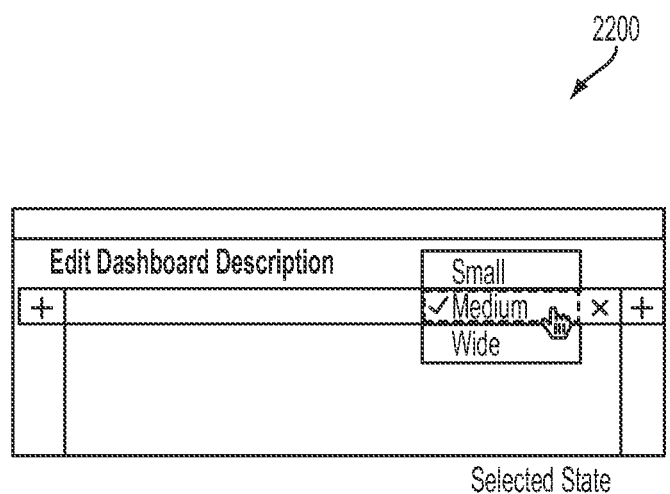
FIG. 22 illustrates a dashboard state selection menu, in accordance with another embodiment.

FIG. 22 illustrates a dashboard state selection menu 2200, in accordance with one embodiment. For example, the menu 2220 may be accessed via the click event and may offer the selections: Small, Medium, Wide. The current selection may be indicated by a check icon and each menu item may have a default state and a hover state.

Table 1 illustrates an exemplary dashboard builder use case. Of course, it should be noted that the use case shown in Table 1 is set forth for illustrative purposes only, and thus should not be construed as limiting in any manner.

TABLE 1

Dashboard builder create a new dashboard
  add a new dashboard component by dragging a component type from sidebar menu to a location on dash canvas
    see component type icon/placeholder
    see grayed out title/head/footer fields
    drag a different component type over an existing component in the canvas to replace it
    see info that no report is associated
    inline edit the component title/header/footer
    edit component settings
      change component type
        if changing between
        bar/line/table/metric/pie/donut/funnel/gauge keep basic
        settings (source report, display units, drill settings)
          if changing from chart to non-chart type and "drill down to filtered report" was selected, see new type default to "drill to source report"
        if changing
        from ar/line/table/metric/pie/donut/funnel/gauge to text/visualforce page/custom s-control
          erase basic settings (source report, display units, drill settings)
      edit display units
      edit "drill down to"
      edit "drill down URL"
      if chart
        edit chart type
        edit "sort by"
        etc. as exists today
      if table
        edit "sort by"
        edit "maximum values displayed"
        etc. as exists today
      if metric
        etc. as exists today
      if gauge
        etc. as exists today
      if text
        toggle header style (bar underneath in same color as font)
        edit font size
        edit font color
        edit font type (bold, italic, underline)
      if visualforce page
        etc. as exists today
      if custom s-control
        etc. as exists today
  move component to a new location on the dash canvas by dragging and dropping
    as dragging, see feedback (simple bar) on where the new component location would be if dropped there
  delete a component
    see the component disappear
    see adjacent components rearrange location
  collapse sidebar
    move components around
    inline edit any text fields on components (title, header, footer)
    edit component properties (wrench) for any component
    un-collapse sidebar
  click on reports tab on sidebar
    use report finder to search by name fragment and see list of results (draggable reports)
    drag a report over the dash canvas and drop over a component to assign/replace this as its source report
      see feedback on what component the report would be associated to if dropped there
        if dragging over a visualforce, text, or s-control component, show that dropping is disabled
      see component refresh (synchronously)
        replace grayed out icon if there was previously no assigned source report TABLE 1-continued Dashboard builder if the report had a defined chart, default all the settings
    to the report chart definition
drag a report over the dash canvas and drop over a blank spot to
create a new component with this as its source report
    see the new component appear
    see component type icon/placeholder
    see grayed out title/head/footer fields
        if the report has a defined chart, default all the settings
        to the report chart definition and see component refresh
        (synchronously)
        drag a component type over this component to
        assign/replace this as its type
add a dashboard column
    if <3 columns currently, see another column get added in the desired
    location (between cols)
    if currently at 3 columns, disable adding extra columns
delete a dashboard column
    if >2 columns currently
        select between deleting the components in the column or
        moving them to the adjacent column on the left
        select ok and see column disappear
        select cancel and see column stay
    if currently at 2 columns, disable deleting columns
change the width of a column
    select between Narrow/Medium/Wide
        see all components in relevant column resize to selected width
edit dashboard properties
    see an overlay to edit the following dashboard property
    fields: title, description, folder, dashboard type, running/edit
    user, default chart settings
        cancel and see the overlay disappear
        save and see the dashboard builder page with 2 default
        (empty) columns, title and description reflected; also get
        feedback on running user and last refresh date
close the dashboard
    see an overlay to warn that there may be unsaved changes
        save changes and go to dashboard view page
        don't save changes
            go to this dashboard view page if previously saved
            go to previously viewed dashboard if editing dashboard
            never saved
        cancel and stay in edit page
save the dashboard
    see a warning (and don't save) if there are incomplete components
    (eg no defined source report or component type)
Edit an existing dashboard
    same as above
"Save As" an existing dashboard (replaces today's clone functionality)
    same as above
Schedule/email a dashboard
View a dashboard
Refresh a dashboard
Delete a dashboard
    unchanged from today except this button should be visible on view
    dashboard page (if user has Manage Dashboards perm) and
    requires confirmation
        after deletion, view the dashboard list page
View emailed dashboard Table 2 illustrates an exemplary black tab user use case. Of course, it should be noted that the use case shown in Table 2 is set forth for illustrative purposes only, and thus should not be construed as limiting in any manner.

TABLE 2 see whether an org has Dashboard Builder enabled
see whether a user profile has dashboard builder enabled
enable the Dashboard Builder org perm
    turns on by default only for the admin profile of the org
    admins see only the new dashboard builder
    other users see only the old dashboard builder
disable the Dashboard Builder org perm
    users in this org see only the old dashboard builder Table 3 illustrates an exemplary administrative user use case. Of course, it should be noted that the use case shown in Table 3 is set forth for illustrative purposes only, and thus should not be construed as limiting in any manner.

TABLE 3 add the Dashboard Builder user perm to a profile
    users in profiles with the user perm see only the new dashboard
    builder
    users in profiles without the user perm see only the old dashboard
    builder
remove the Dashboard Builder user perm from a profile
    users in profiles with the user perm see only the new dashboard
    builder
    users in profiles without the user perm see only the old dashboard
    builder
create and delete sections
name/rename section
re-order full section (including underlying components)
add/remove dashboard components
add/remove dashboard columns
    number of columns independent for each section
adjust width of dashboard columns (drag-to-snap)
    widths independent for each section
adjust size of dashboard components according to column widths
(maintain aspect ratio)
save (and auto-save) draft dashboard (including components without
source reports)
delegate dashboard editing rights to user (different from dashboard
creator) without "view all data" rights
add components with new chart types
    bullet graphs
    sparklines
    scatter charts
    bubble charts
define breakpoints and targets for line, bar, column charts, bullet
graphs, and sparklines
drag-drop full components from "clipboard"
text components
drill to detail on table components
show recent dashboards in finder
redo/undo
extra chart builder flexibility (eg 4-col definitions, combo charts)
within dashboard builder
Dashboard viewer
    expand and collapse dashboard sections (may show only title if
    collapsed)
    view dashboards with pretty rounded corners
    print dashboards (printer-friendly view, with rounded corners)
    view emailed dashboards (with rounded corners)
    save components to clipboard (if user has edit dashboard rights)
Report builder
    build a "reports with dashboards" report, showing which reports are
    used as source for components on which dashboards (possibly turn it
    into a standard report type)

Table 4 illustrates an exemplary visual force page layout using embedded analytics. Of course, it should be noted that the page layout shown in Table 4 is set forth for illustrative purposes only, and thus should not be construed as limiting in any manner.

TABLE 4 visualforce

<analytics:panel layout="border">
    <analytics:panel pos="center">
        <!--content-->
    </analytics:panel>
    <analytics:panel pos="south">
        <!--content-->
    </analytics:panel>
    generated extjs TABLE 4-continued visualforce

```
new Ext.Panel({
    layout: 'border',
    items: [{region: 'center'}, {region:'south'}]
});
```

System Overview

Figure 23:
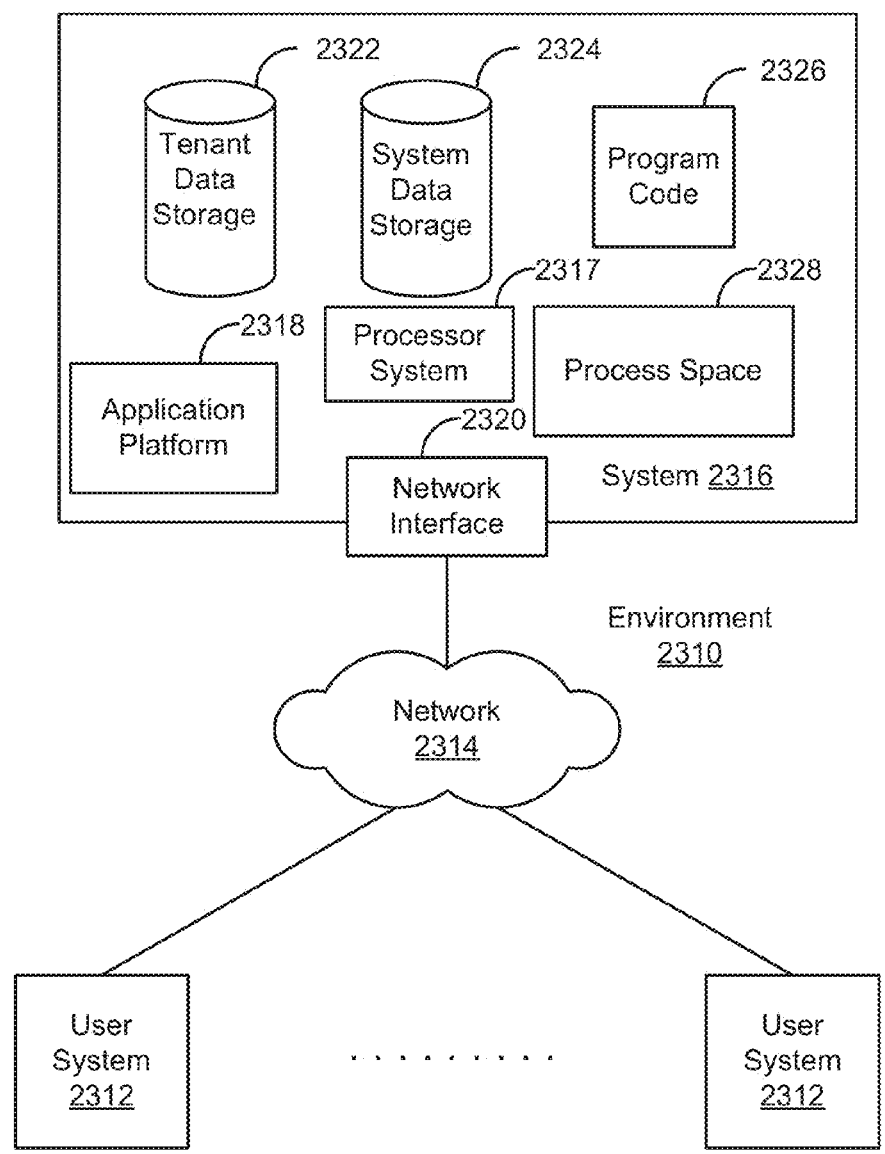
FIG. 23 illustrates a block diagram of an example of an environment wherein an on-demand database system might be used.

FIG. 23 illustrates a block diagram of an environment 2310 wherein an on-demand database system might be used. Environment 2310 may include user systems 2312, network 2314, system 2316, processor system 2317, application platform 2318, network interface 2320, tenant data storage 2322, system data storage 2324, program code 2326, and process space 2328. In other embodiments, environment 2310 may not have all of the components listed and/or may have other elements instead of, or in addition to, those listed above.

Environment 2310 is an environment in which an on-demand database system exists. User system 2312 may be any machine or system that is used by a user to access a database user system. For example, any of user systems 2312 can be a handheld computing device, a mobile phone, a laptop computer, a work station, and/or a network of computing devices. As illustrated in FIG. 23 (and in more detail in FIG. 24) user systems 2312 might interact via a network 2314 with an on-demand database system, which is system 2316.

An on-demand database system, such as system 2316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 2316" and "system 2316" will be used interchangeably herein. A database image may include one or more database objects. A relational database management system (RDMS) or the equivalent may execute storage and retrieval of information against the database object(s). Application platform 2318 may be a framework that allows the applications of system 2316 to run, such as the hardware and/or software, e.g., the operating system. In an embodiment, on-demand database system 2316 may include an application platform 2318 that enables creation, managing and executing one or more applications developed by the provider of the on-demand database system, users accessing the on-demand database system via user systems 2312, or third party application developers accessing the on-demand database system via user systems 2312.

The users of user systems 2312 may differ in their respective capacities, and the capacity of a particular user system 2312 might be entirely determined by permissions (permission levels) for the current user. For example, where a salesperson is using a particular user system 2312 to interact with system 2316, that user system has the capacities allotted to that salesperson. However, while an administrator is using that user system to interact with system 2316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2314 is any network or combination of networks of devices that communicate with one another. For example, network 2314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 2312 might communicate with system 2316 using TCP/IP and, at a higher network level, use other common Internet protocols to communicate, such as HTTP, FTP, AFS, WAP, etc. In an example where HTTP is used, user system 2312 might include an HTTP client commonly referred to as a "browser" for sending and receiving HTTP messages to and from an HTTP server at system 2316. Such an HTTP server might be implemented as the sole network interface between system 2316 and network 2314, but other techniques might be used as well or instead. In some implementations, the interface between system 2316 and network 2314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2316, shown in FIG. 23, implements a web-based customer relationship management (CRM) system. For example, in one embodiment, system 2316 includes application servers configured to implement and execute CRM software applications as well as provide related data, code, forms, webpages and other information to and from user systems 2312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2316 implements applications other than, or in addition to, a CRM application. For example, system 2316 may provide tenant access to multiple hosted (standard and custom) applications, including a CRM application. User (or third party developer) applications, which may or may not include CRM, may be supported by the application platform 2318, which manages creation, storage of the applications into one or more database objects and executing of the applications in a virtual machine in the process space of the system 2316.

One arrangement for elements of system 2316 is shown in FIG. 23, including a network interface 2320, application platform 2318, tenant data storage 2322 for tenant data 2323, system data storage 2324 for system data 2325 accessible to system 2316 and possibly multiple tenants, program code 2326 for implementing various functions of system 2316, and a process space 2328 for executing MTS system processes and tenant-specific processes, such as running applications as part of an application hosting service. Additional processes that may execute on system 2316 include database indexing processes.

Several elements in the system shown in FIG. 23 include conventional, well-known elements that are explained only briefly here. For example, each user system 2312 could include a desktop personal computer, workstation, laptop, PDA, cell phone, or any wireless access protocol (WAP) enabled device or any other computing device capable of interfacing directly or indirectly to the Internet or other network connection. User system 2312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 2312 to access, process and view information, pages and applications available to it from system 2316 over network 2314. Each user system 2312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2316 or other systems or servers. For example, the user interface device can be used to access data and applications hosted by system 2316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2312 and all of its components are operator configurable using applications, such as a browser, including computer code run using a central processing unit such as an Intel Pentium® processor or the like. Similarly, system 2316 (and additional instances of an MTS, where more than one is present) and all of their components might be operator configurable using application(s) including computer code to run using a central processing unit such as processor system 2317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 2316 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc. as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 2316 is configured to provide webpages, forms, applications, data and media content to user (client) systems 2312 to support the access by user systems 2312 as tenants of system 2316. As such, system 2316 provides security mechanisms to keep each tenant's data separate unless the data is shared. If more than one MTS is used, they may be located in dose proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 24:
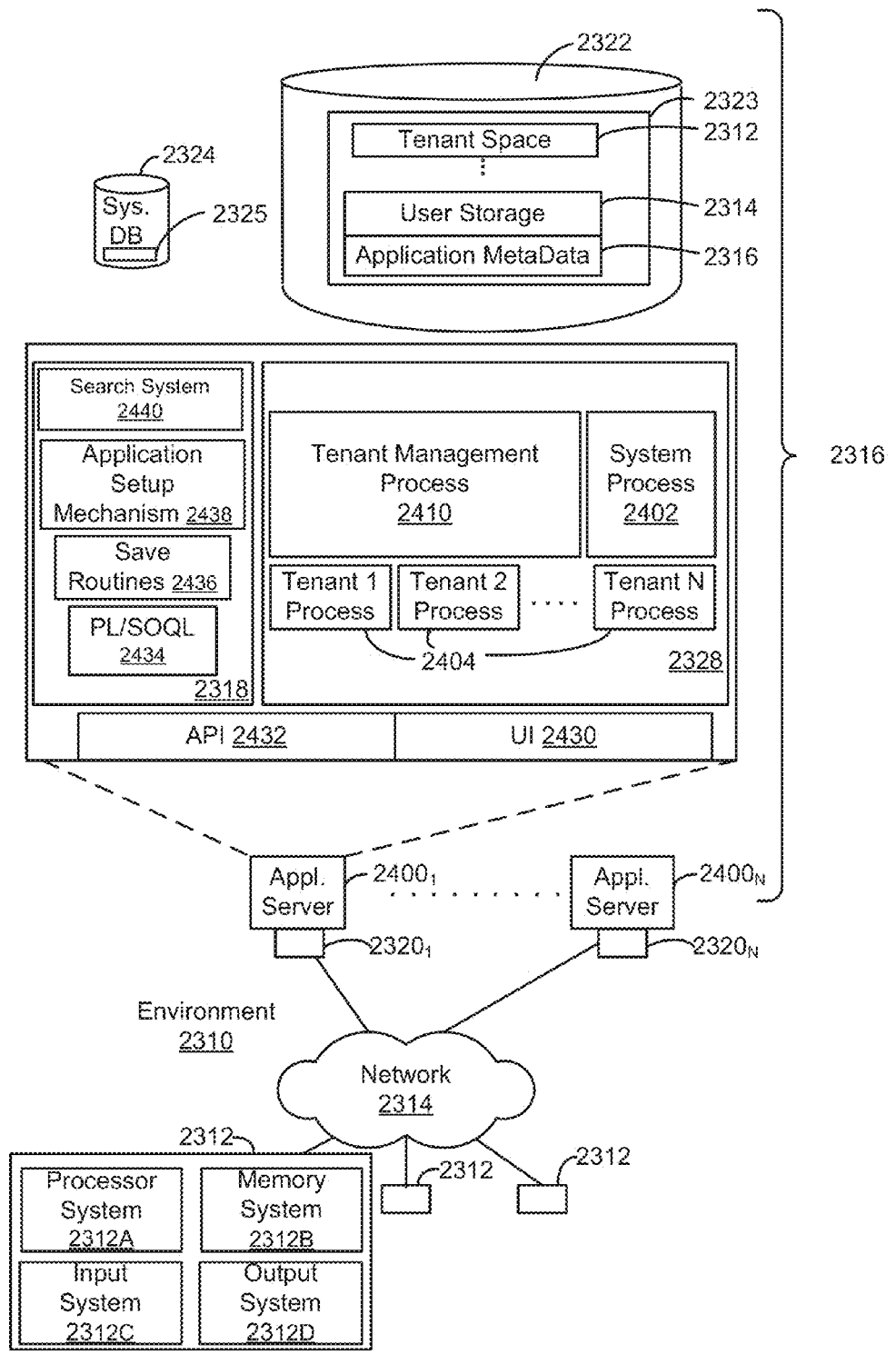
FIG. 24 illustrates a block diagram of an embodiment of elements of FIG. 23 and various possible interconnections between these elements.

FIG. 24 also illustrates environment 2310. However, in FIG. 24 elements of system 2316 and various interconnections in an embodiment are further illustrated. FIG. 24 shows that user system 2312 may include processor system 2312A, memory system 2312B, input system 2312C, and output system 2312D. FIG. 24 shows network 2314 and system 2316. FIG. 24 also shows that system 2316 may include tenant data storage 2322, tenant data 2323, system data storage 2324, system data 2325. User Interface (UI) 2430, Application Program interface (API) 2432, PL/SOQL 2434, save routines 2436, application setup mechanism 2438, applications servers $2400_1$-$2400_N$, system process space 2402, tenant process spaces 2404, tenant management process space 2410, tenant storage area 2412, user storage 2414, and application metadata 2416. In other embodiments, environment 2310 may not have the same elements as those listed above and/or may have other elements instead of, or in addition to, those listed above.

User system 2312, network 2314, system 2316, tenant data storage 2322, and system data storage 2324 were discussed above in FIG. 23. Regarding user system 2312, processor system 2312A may be any combination of one or more processors. Memory system 2312B may be any combination of one or more memory devices, short term, and/or long term memory. Input system 2312C may be any combination of input devices, such as one or more keyboards, mice, trackballs, scanners, cameras, and/or interfaces to networks. Output system 2312D may be any combination of output devices, such as one or more monitors, printers, and/or interfaces to networks. As shown by FIG. 24, system 2316 may include a network interface 2320 (of FIG. 23) implemented as a set of HTTP application servers 2400, an application platform 2318, tenant data storage 2322, and system data storage 2324.

Also shown is system process space 2402, including individual tenant process spaces 2404 and a tenant management process space 2410. Each application server 2400 may be configured to tenant data storage 2322 and the tenant data 2323 therein, and system data storage 2324 and the system data 2325 therein to serve requests of user systems 2312. The tenant data 2323 might be divided into individual tenant storage areas 2412, which can be either a physical arrangement and/or a logical arrangement of data. Within each tenant storage area 2412, user storage 2414 and application metadata 2416 might be similarly allocated for each user. For example, a copy of a user's most recently used (MRU) items might be stored to user storage 2414. Similarly, a copy of MRU items for an entire organization that is a tenant might be stored to tenant storage area 2412. A UI 2430 provides a user interface and an API 2432 provides an application programmer interface to system 2316 resident processes to users and/or developers at user systems 2312. The tenant data and the system data may be stored in various databases, such as one or more Oracle™ databases.

Application platform 2318 includes an application setup mechanism 2438 that supports application developers' creation and management of applications, which may be saved as metadata into tenant data storage 2322 by save routines 2436 for execution by subscribers as one or more tenant process spaces 2404 managed by tenant management process 2410 for example. Invocations to such applications may be coded using PL/SOQL 2434 that provides a programming language style interface extension to API 2432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 2416 for the subscriber making the invocation and executing the metadata as an application in a virtual machine.

Each application server 2400 may be communicably coupled to database systems, e.g., having access to system data 2325 and tenant data 2323, via a different network connection. For example, one application server $2400_1$ might be coupled via the network 2314 (e.g., the Internet), another application server $2400_{N-1}$ might be coupled via a direct network link, and another application server $2400_N$ might be coupled by yet a different network connection. Transfer Control Protocol and Internet Protocol (TCP/IP) are typical protocols for communicating between application servers 2400 and the database system. However, it will be apparent to one skilled in the art that other transport protocols may be used to optimize the system depending on the network interconnect used.

In certain embodiments, each application server 2400 is configured to handle requests for any user associated with any organization that is a tenant. Because it is desirable to be able to add and remove application servers from the server pool at any time for any reason, there is preferably no server affinity for a user and/or organization to a specific application server 2400. In one embodiment, therefore, an interface system implementing a load balancing function (e.g., an F5 Big-IP load balancer) is communicably coupled between the application servers 2400 and the user systems 2312 to distribute requests to the application servers 2400. In one embodiment, the load balancer uses a least connections algorithm to route user requests to the application servers 2400. Other examples of load balancing algorithms, such as round robin and observed response time, also can be used. For example, in certain embodiments, three consecutive requests from the same user could hit three different application servers 2400, and three requests from different users could hit the same application server 2400. In this manner, system 2316 is multitenant, wherein system 2316 handles storage of and access to, different objects, data and applications across disparate users and organizations.

As an example of storage, one tenant might be a company that employs a sales force where each salesperson uses system 2316 to manage their sales process. Thus, a user might maintain contact data, leads data, customer follow-up data, performance data, goals and progress data, etc., all applicable to that user's personal sales process (e.g., in tenant data storage 2322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2316 might also maintain system level data usable by multiple tenants or other data. Such system level data might include industry reports, news, postings, and the like that are sharable among tenants.

In certain embodiments, user systems 2312 (which may be client systems) communicate with application servers 2400 to request and update system-level and tenant-level data from system 2316 that may require sending one or more queries to tenant data storage 2322 and/or system data storage 2324. System 2316 (e.g., an application server 2400 in system 2316) automatically generates one or more SQL statements (e.g., one or more SQL queries) that are designed to access the desired information. System data storage 2324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for displaying data utilizing a selected source and visualization, the method comprising:
   displaying an editor, including:
      a canvas simulating a display including a plurality of columns, and
      a sidebar separate from the canvas containing:
         a tab that displays a plurality of sources of data filtered by one or more criteria, where each of the plurality of sources of data is represented by an icon, and
         a tab that displays a plurality of possible visualizations for the data, where each of the plurality of possible visualizations is represented by an icon:
   receiving a selection of a first source of data from the plurality of sources of data, where the selection includes the dragging of the icon representing the first source of data from the sidebar into a first column of the plurality of columns of the canvas, where the icon represents the first source of data on the canvas;
   receiving a selection of a first visualization from the plurality of possible visualizations for the data, where the selection includes the dragging of the icon representing the first visualization from the sidebar onto the icon representing the first source of data on the first column of the canvas; and
   in response to receiving the selection of the first source of data and the first visualization, retrieving data from a location indicated by the first source of data and automatically displaying the retrieved data in association with the first visualization in the first column of the canvas.

2. The computer program product of claim 1, wherein the plurality of sources of data include a plurality of locations of the data within a system.

3. The computer program product of claim 1, wherein the computer program product is operable such that a file name associated with a file including the data is displayed next to each icon representing each of the plurality of sources of data.

4. The computer program product of claim 1, wherein the plurality of sources of data are displayed as a result of a search.

5. The computer program product of claim 1, wherein the plurality of possible visualizations for the data include one or more of charts for displaying the data, tables for displaying the data, bar graphs for displaying the data, line graphs for displaying the data, and gauges for displaying the data.

6. The computer program product of claim 1, wherein the editor is a dashboard editor.

7. The computer program product of claim 6, wherein the dashboard editor enables at least the addition, removal, and editing of a content of the dashboard.

8. The computer program product of claim 1, wherein the selection of one of the plurality of sources of data and one of the plurality of visualizations for the data is performed by a user of the editor within a system.

9. The computer program product of claim 8, wherein the editor includes an editor for a dashboard of a multi-tenant on-demand database system.

10. The computer program product of claim 1, wherein the data is rendered within the selected visualization for the data.

11. The computer program product of claim 1, wherein one or more properties of the selected first visualization are configured.

12. The computer program product of claim 1, wherein the one or more criteria by which the plurality of sources of data is filtered indicate that only sources of data that have been viewed by a user within a predetermined period of time are to be displayed within the tab that displays the plurality of sources of data.

13. The computer program product of claim 1, wherein the one or more criteria by which the plurality of sources of data is filtered indicate that only sources of data to which a user has ownership are to be displayed within the tab that displays the plurality of sources of data.

14. The computer program product of claim 1, wherein the one or more criteria by which the plurality of sources of data is filtered indicate that all sources of data that are visible to a user within a system are to be displayed within the tab that displays the plurality of sources of data.

15. The computer program product of claim 1, wherein the one or more criteria by which the plurality of sources of data is filtered include one or more search criteria.

16. A method, comprising:
   displaying an editor, including:
      a canvas simulating a display including a plurality of columns, and
      a sidebar separate from the canvas containing:
         a tab that displays a plurality of sources of data filtered by one or more criteria, where each of the plurality of sources of data is represented by an icon, and
         a tab that displays a plurality of possible visualizations for the data, where each of the plurality of possible visualizations is represented by an icon;
   receiving a selection of a first source of data from the plurality of sources of data, where the selection includes the dragging of the icon representing the first source of data from the sidebar into a first column of the plurality of columns of the canvas, where the icon represents the first source of data on the canvas;

receiving a selection of a first visualization from the plurality of possible visualizations for the data, where the selection includes the dragging of the icon representing the first visualization from the sidebar onto the icon representing the first source of data on the first column of the canvas; and in response to receiving the selection of the first source of data and the first visualization, retrieving data from a location indicated by the first source of data and automatically displaying the retrieved data in association with the first visualization in the first column of the canvas.

17. An apparatus, comprising:

a processor for:
  displaying an editor, including:
    a canvas simulating a display including a plurality of columns, and
    a sidebar separate from the canvas containing:
      a tab that displays a plurality of sources of data filtered by one or more criteria, where each of the plurality of sources of data is represented by an icon, and
      a tab that displays a plurality of possible visualizations for the data, where each of the plurality of possible visualizations is represented by an icon;
  receiving a selection of a first source of data from the plurality of sources of data, where the selection includes the dragging of the icon representing the first source of data from the sidebar into a first column of the plurality of columns of the canvas, where the icon represents the first source of data on the canvas;
  receiving a selection of a first visualization from the plurality of possible visualizations for the data, where the selection includes the dragging of the icon representing the first visualization from the sidebar onto the icon representing the first source of data on the first column of the canvas; and
  in response to receiving the selection of the first source of data and the first visualization, retrieving data from a location indicated by the first source of data and automatically displaying the retrieved data in association with the first visualization in the first column of the canvas.

18. A method for transmitting code for use in a multi-tenant database system on a transmission medium, the method comprising:

transmitting code for displaying an editor, including:
  a canvas simulating a display including a plurality of columns, and
  a sidebar separate from the canvas containing:
    a tab that displays a plurality of sources of data filtered by one or more criteria, where each of the plurality of sources of data is represented by an icon, and
    a tab that displays a plurality of possible visualizations for the data, where each of the plurality of possible visualizations is represented by an icon;

transmitting code for receiving a selection of a first source of data from the plurality of sources of data, where the selection includes the dragging of the icon representing the first source of data from the sidebar into a first column of the plurality of columns of the canvas, where the icon represents the first source of data on the canvas;

transmitting code for receiving a selection of a first visualization from the plurality of possible visualizations for the data, where the selection includes the dragging of the icon representing the first visualization from the sidebar onto the icon representing the first source of data on the first column of the canvas; and transmitting code for, in response to receiving the selection of the first source of data and the first visualization, retrieving data from a location indicated by the first source of data and automatically displaying the retrieved data in association with the first visualization in the first column of the canvas.

* * * * *